United States Patent [19]
Gulistan

[11] 3,947,945
[45] Apr. 6, 1976

[54] ARRANGEMENT FOR REMOVAL OF CAPTIVE FASTENER

[75] Inventor: Bulent Gulistan, Malibu, Calif.

[73] Assignee: Deutsch Fastener Corporation, Los Angeles, Calif.

[22] Filed: Jan. 13, 1975

[21] Appl. No.: 540,583

[52] U.S. Cl. .................... 29/235; 29/225; 29/282; 29/427
[51] Int. Cl.² ........................................ B23D 19/02
[58] Field of Search ............ 29/235, 229, 225, 280, 29/282, 283, 427, 200 H; 151/69, 41.7

[56] References Cited
UNITED STATES PATENTS

| | | | |
|---|---|---|---|
| 3,099,876 | 8/1963 | Lawless | 29/229 |
| 3,393,439 | 7/1968 | Shriver | 29/208 |
| 3,765,465 | 10/1973 | Gulistan | 151/69 |

Primary Examiner—C. W. Lanham
Assistant Examiner—James R. Duzan
Attorney, Agent, or Firm—Gausewitz, Carr & Rothenberg

[57] ABSTRACT

This invention provides a removal arrangement for a fastener element which includes spaced exterior portions of a first diameter with a frustoconical portion in between, the frustoconical portion tapering from the first portion to a shoulder that connects to the third portion. A resilient retainer ring fits within a groove in a grommet attachable to a workpiece and encircles the fastener element at the first and third surface portions, and is engageable with the shoulder for preventing separation of the fastener element from the retainer ring. In the removal of the fastener element, an expansible member is extended over the fastener to encircle it at the third surface portion, the expansible member presenting an exterior surface substantially that of the first diameter of the fastener, bridging between the first and second surface portions so that said fastener element can be withdrawn from the retainer ring. The withdrawal, preferably, is accomplished by a punch having an extension of the same diameter as an opening in the fastener element, and a second portion of the first diameter, with a shoulder in between for engaging one end of the fastener element, and a backup member for engaging the grommet and the workpiece to which the grommet is attached, the backup member having an opening receiving the fastener element as it is withdrawn from the retainer ring.

11 Claims, 8 Drawing Figures

U.S. Patent  April 6, 1976  Sheet 1 of 2  3,947,945
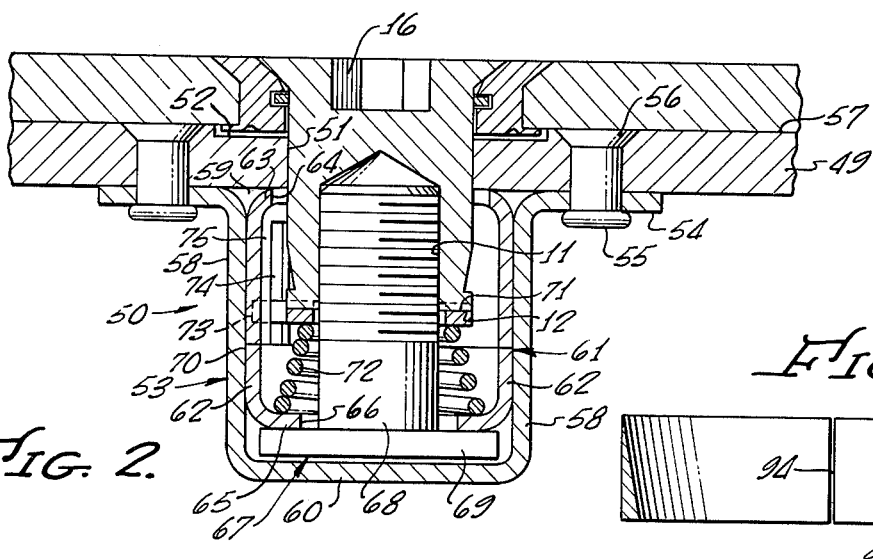
FIG. 2.
FIG. 8.
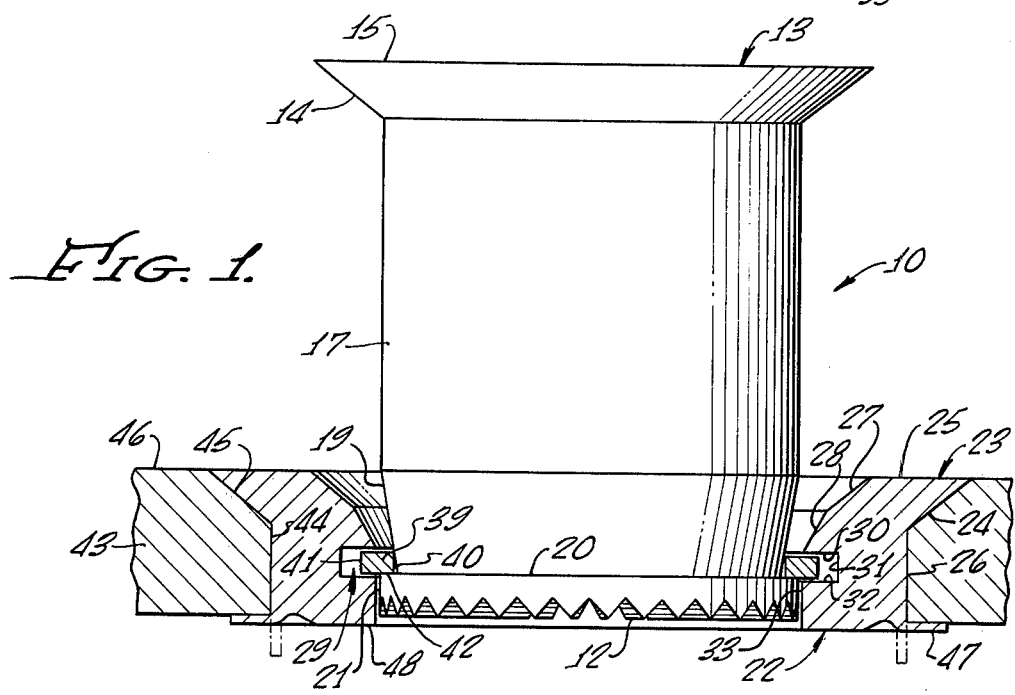
FIG. 1.
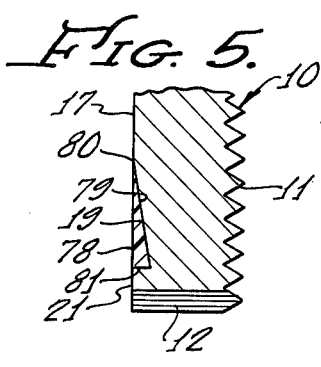
FIG. 5.
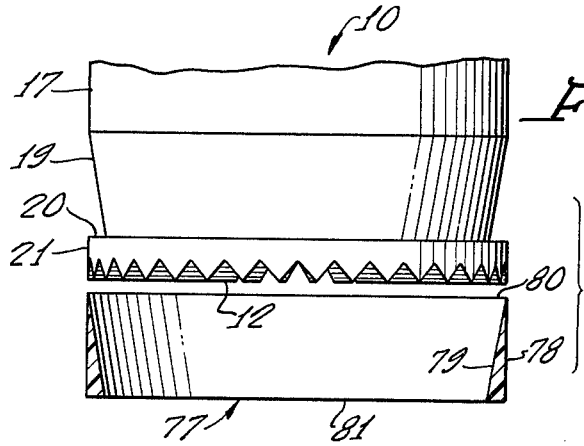
FIG. 3.

ARRANGEMENT FOR REMOVAL OF CAPTIVE FASTENER

BACKGROUND OF THE INVENTION:

1. Field of the Invention

This invention pertains to the arrangement for removal of captive fasteners.

2. Description of Prior Art

Captive fasteners currently are in wide use, offering obvious advantages in that the fastener element is retained to the part and always available for being secured after the part has been loosened. One of the more advantageous captive fasteners is disclosed in U.S. Pat. No. 3,765,465 pertaining to a captive nut which is adapted to made with a stud on an adjoining part. The nut has a flush head at one end, from which extends a cylindrical exterior surface that meets with a frustoconical surface, converging toward the opposite end of the nut and terminating at a radial shoulder. Beyond the shoulder is a short cylindrical section of the same exterior diameter as that of the first portion. The nut is received within a grommet which has a flush head at one end and a relatively thin wall at the opposite end. The grommet is extended through an opening in a workpiece and the thin-walled portion is flared outwardly to form a flange that cooperates with the head in holding the grommet to the workpiece. The grommet has an internal annular groove which receives a retainer ring which encircles the exterior of the nut, being slidable along its principal cylindrical surface and the frustoconical portion. When the retainer ring engages the shoulder of the nut, it prevents withdrawal of the nut from the grommet in one direction. Thus, the nut is held to the grommet and hence to the workpiece.

Fasteners of this type frequently are used with thin panels which may not have much strength. On advanced military aircraft, for example, the grommet may be attached to a thin graphite panel. This presents a difficulty in the event the nut becomes damaged and needs to be replaced. Because the retainer ring prevents the nut from being withdrawn from the grommet it has been necessary to remove the entire assembly, including the grommet, from the workpiece. This is difficult to do without damaging the workpiece, particularly where the workpiece is relatively thin. An axial force on the grommet sufficient to straighten out the flared portion so that the grommet can be taken from the opening in the panel often will damage the panel. fastener replacement, therefore, has been a relatively slow, expensive and unsatisfactory operation.

SUMMARY OF THE INVENTION

The present invention overcomes the problem of fastener removal, allowing replacement of the nut alone rather than the entire assembly. The grommet and the retainer ring stay in place with the part and no damaging forces are imposed upon the part. A replacement nut then can be introduced into the grommet and the fastener repair is complete. The operation is safe, rapid and economical.

In order to remove the nut from the grommet, an annular member is prepared, having an exterior cylindrical surface of substantially the same diameter as that of the cylindrical exterior portions of the nut. It has a tapered interior surface which is at the same angle as that of the frustoconical portion of the nut. The length of the annular member is substantially that of the fastener at the frustoconical portion. The annular member is of resilient material which allows it to be expanded to fit over the end of the nut and to contract around the nut at the tapered portion. This causes the annular member to present an exterior surface that is a continuation of the cylindrical surfaces of the nut which permits the nut to be withdrawn from the retainer ring.

In accomplishing the withdrawal of the nut from the grommet, the nut is positioned axially of the grommet such that its frustoconical portion projects outwardly beyond the grommet. The retainer ring then extends around the principle cylindrical part of the nut and is spaced from the frustoconical portion. The annular member is then fitted over the tapered portion of the nut. A punch is associated with the outer end of the nut and used to force the nut from the grommet. The punch has an end that slidably fits in the threaded opening of the nut and a shoulder that can engage the outer end of the nut. Inwardly of the shoulder the punch has the same diameter as that of the cylindrical portions of the nut. A backup member is located on the opposite side of the panel, this member having a relatively wide, flat surface that engages the panel and the grommet, as well as a central opening that is larger in diameter than the head of the nut. With the backup member held manually, the punch may be advanced axially so as to push the nut out of the grommet and into the opening in the backup member. With the backup member engaging both the panel and the grommet, the panel is not subjected to any damaging forces. The nut easily is displaced from the grommet as the retainer ring slides along the outer surfaces of the nut and of the annular member encircling the nut.

BRIEF DESCRIPTION OF THE DRAWINGS

FIG. 1 is a side elevational view, partially in section, of a captive fastener element;

FIG. 2 is a longitudinal sectional view of the captive fastener assembly in the secured position;

FIG. 3 is an enlarged fragmentary view showing the fastener element with the removal ring;

FIG. 5 is an enlarged fragmentary sectional view showing the removal ring installed on the fastener;

FIG. 8 is a sectional view of a modified form of removal ring.

DESCRIPTION OF THE PREFERRED EMBODIMENT

Figure 4:
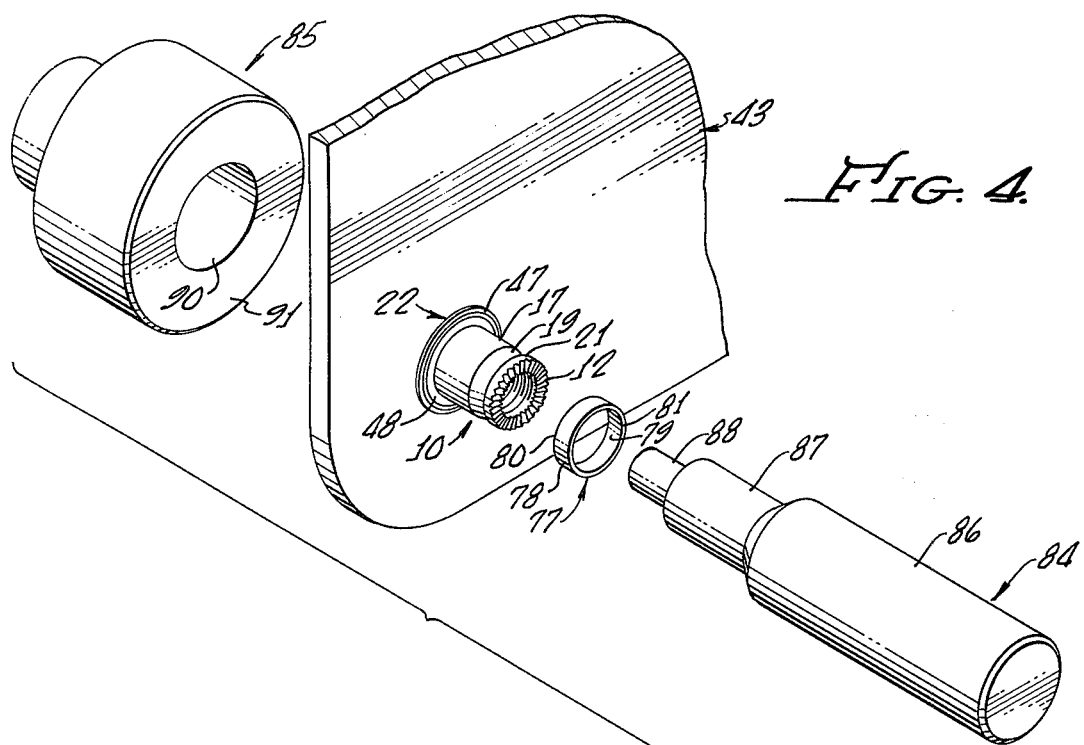
FIG. 4 is a perspective view of the components for removing the fastener element.

The nut 10 in FIG. 1 includes a blind tapped axial opening 11 extending inwardly from one end 12. The nut 10 is of the general type shown in U.S. Pat. No. 3,192,980, with the end 12 being serrated, defining shallow radially extending teeth. At the opposite end of the nut 10 is a head 13 having a frustoconical undersurface 14 and a flat outer end surface 15. In the central part of the head 13 is a driving recess 16. The exterior surface 17 of the nut that connects to the frustoconical undersurface 14 of the head 13 is cylindrical and extends the major portion of the length of the nut. The outer end of the surface 17 connects to a tapered surface 19, which is frustoconical in configuration and is at a shallow angle relative to the axis of the nut 10. At the apical end of the surface 19 is a radial shoulder 20 which is close to the outer end 12 of the nut. Beyond the shoulder 20 is a short cylindrical surface 21, which has the same diameter as that of the surface 17.

The nut 10 is adapted to fit within a sleeve or grommet 22 of the type found in U.S. Pat. No. 3,765,465, at one end of which is a head 23 having a frustoconical undersurface 24 and a radial outer end surface 25. A cylindrical exterior surface 26 connects to the undersurface 24 of the head 23 and extends to the opposite end of the grommet 22.

The bore through the grommet 22 includes a frustoconical surface 27 that extends inwardly from the end 25 of the head 23, tapering in diameter inwardly. The inner end of the surface 27 connects to a second frustoconical surface 28, which has a more shallow taper than that of the surface 27. An annular groove 29 at the intermediate portion of the grommet 22 has a radial wall 30 that connects to the inner end of the tapered surface 28. The groove 29 also includes a circumferential surface 31 and a second radial wall 32 opposite from the wall 30. Beyond the annular groove 29 is a short cylindrical surface 33, dimensioned so that it can substantially complementarily receive the surfaces 17 and 21 of the nut.

Prior to introducing the nut 10 into the grommet 22, a split resilient retainer ring 39 is fitted into the annular groove 29. The radial thickness of the ring 39, between its inner and outer circumferential surfaces 40 and 41, is no greater than the depth of the groove 29. Consequently, the ring 39 can be expanded so that it is entirely received within the groove 29 and does not project inwardly past the surface 33 of the bore. The free inside diameter of the ring 39, on the other hand, is less than that of the nut, including its tapered surface 19, so that the inner edge 40 of the ring bears against the periphery of the nut 10 and exerts a compressive force. When the nut 10 is moved axially relative to the grommet 22, the ring 39 slides along the surface of the nut. The nut 10 cannot be removed from the grommet by moving it upwardly from the position shown in FIG. 2 because the shoulder 20 of the nut will engage the outer radial surface 42 of the ring 39, acting as an abutment to preclude such separation. The nut head 13 prevents separation in the other direction. With the nut 10 being longer than the grommet 22, the nut can move axially for a limited distance as determined by the positions of the nut head 13 and the shoulder 20.

With the nut 10 received in the grommet 22, the latter member may be secured to a workpiece, such as a thin panel 43. An opening 44 is provided in the panel 43, substantially complementary to the cylindrical surface 26 of the grommet 22. In addition, a spot face 45, complementary to the undersurface 24 of the head 23 of the grommet, is formed at one end of the cylindrical opening 44. The grommet 22 is fitted into the opening in the panel 43 so that the head 23 is entirely received within the spot face 45 and the end 25 of the grommet is flush with the outer surface 46 of the panel. The opposite end portion of the grommet is bent outwardly to form a flange 47 at the plane of the end 48 of the grommet which cooperates with the head 23 in securely holding the grommet 22 to the panel 43.

The nut 10 then may be used in securing the panel 43 to an adjoining part, such as the member 49 shown in FIG. 2. Normally, there will be several nuts 10 used in holding the panel 43 to the member 49. The fastener assembly 50, attached to the member 49 for mating with the nut 10, is of the type shown in U.S. Pat. No. 3,192,980. The member 49 is given an opening 51 through which the nut 10 can extend, while a shallow counterbore 52 can receive the outwardly bent flange 48. Secured to the opposite side of the member 49 is a cage 53, which has outwardly projecting flanges 54 at one end, through which extend rivets 55 used in securing the cage to the member 49. The rivets 55 have flush heads 56 at the surface 57 of the member 49 adjacent the panel 43.

The sidewalls 58 of the cage 53 define a substantially square receptacle having an open end 59 adjacent the member 49 and a wall 60 closing the opposite end. Within the cage 53 is a two-piece receptacle 61 having sidewalls 62 complementary to the sidewalls 58 of the cage 53. The end 63 of the receptacle 61 has a circular opening 64, while the opposite end wall 65 is spaced from the wall 60 of the cage 53 and provided with a circular opening 66. A stud 67 has a shank 68, threaded at its outer end, that extends through the opening 66 from a flat square head 69. The head 69 is held loosely between the walls 65 and 60, so that it is permitted limited lateral movement, while the square sides of the head 69 prevent substantial rotation to it.

Around the shank 68 is a plate or washer 70, which has square sides and teeth on its outwardly facing surface 71. A compression spring 72 bears against the opposite surface of the plate 70, biasing it toward the end 63 of the inner receptacle 61. A tab 73 extends from one corner of the plate 70 and into a longitudinal slot 74 in a flattened corner 75 of the inner receptacle 61. This holds the plate 70 against substantial rotation relative to the inner receptacle 61, but allows the plate floating movement laterally.

In the secured position of the fastener, the threaded shank 68 of the stud 67 is received in the opening 11 of the nut. The serrated end wall 12 of the nut 10 is engaged by the similar serrations on the surface 71 of the plate 70, which is held against the nut by the spring 72. When the nut is being rotated, its teeth slide across the teeth of the plate 70. When the fastener is fully tightened, the interengaging teeth of the plate 70 and the nut 10 provide a locking effect which will not permit the nut to be loosened from vibrational forces or other service conditions.

In the fully secured position of the fastener, the outer surface 15 of the nut head 13 is substantially flush with the outer surface 25 of the grommet 22 and with the surface 46 of the panel 43.

In the event of damage to the nut 10, it is easily removed from the grommet 22, through the use of a ring 77, shown in FIGS. 3–7. This ring, which may be made of nylon, has a cylindrical exterior surface 78 which is substantially the same diameter as that of the surfaces 17 and 21 of the nut 10. The inside surface 79 of the ring 77 is frustoconical, intersecting the outer surface 78 at one end 80 of the ring. At the opposite end 81 the surface 79 is spaced from the outer surface 78. The inner surface 79 of the ring 77 is at the same angle to the axis of the ring as that of the tapered surface 19 of the nut 10 with respect to the axis of the nut. Also, the length of the ring 77 is substantially equal to the length of the nut between the shoulder 20 and the inner end of the surface 19. At the end of 81 of the ring 77, the wall thickness of the ring is substantially equal to the width of the shoulder 20 of the nut 10.

The ring 77 is associated with the nut 10 at the tapered surface 19 so as to cooperate with the surfaces 17 and 21 of the nut in providing an exterior surface of constant diameter. This is accomplished by moving the nut 10 axially relative to the grommet 22 to a position where the tapered portion 19 of the nut is spaced beyond the end surface 36 of the grommet, as indicated in FIG. 5. With the nut in this location, the retainer ring 39 encircles the cylindrical wall 17 of the nut and is remote from the tapered surface 19. The ring 77 then is expanded so as to slide over the short outer cylindrical surface 21 before contracting into the groove provided at the tapered surface 19. With the ring 77 being made of a stretchable material such as nylon, this is easily accomplished by first placing one side into the groove at the tapered surface 19 and then stretching the other side over the outer end portion 21 to also engage the surface 19. The outer surface 78 of the ring 77 then bridges between the cylindrical surfaces 17 and 21 of the nut 10 so that there is a constant exterior diameter throughout the length of the nut 10 beyond its head 13. This enables the nut 10 to be removed from the grommet 22 simply by moving it axially through the grommet so that the outer end 42 is pulled free of the grommet. As this occurs, the retainer ring 39 slides first along the surface 17 of the nut, then along the surface 78 of the ring 77, as shown in FIG. 6, and finally along the nut surface 21 until the nut has passed axially out of the grommet.

The removal of the nut is accomplished easily and with no damage to the panel 43 through the use of a punch 84 and backing block 85 as illustrated in FIGS. 4 and 5. The punch 84 includes a handle 86 beyond which is a cylindrical portion 87 having the same diameter as that of the outer surfaces 17 and 21 of the nut 10, and 78 of the ring 77. Beyond the portion 87 is a cylindrical end part 88 dimensioned to generally complementarily fit within the opening 11 of the nut. The end part 81 of the punch is unthreaded and so slides into the opening 11 at the minor diameter of the threads. A radial shoulder 89 connects the cylindrical surfaces 87 and 88.

The backing block 85 includes a cylindrical axial opening 90 which is larger than the diameter of the head 13 of the nut 10, but smaller than the diameter of the head 23 of the grommet 22. One end of the backing block is enlarged so as to provide a wide, flat radial surface 91.

Figure 6:
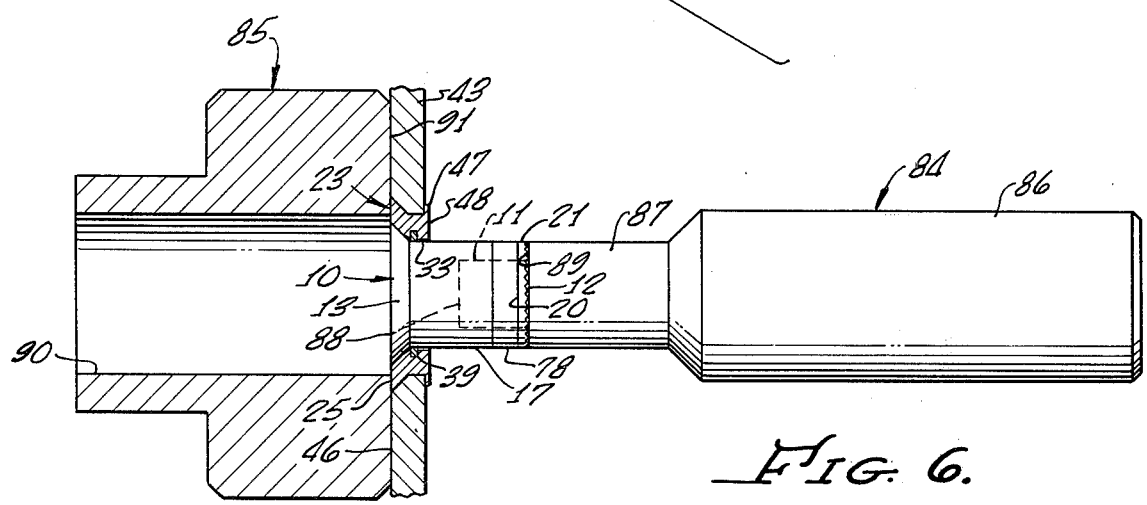
FIG. 6 is a side elevational view, partially in section, showing the fastener element prepared for removal.
Figure 7:
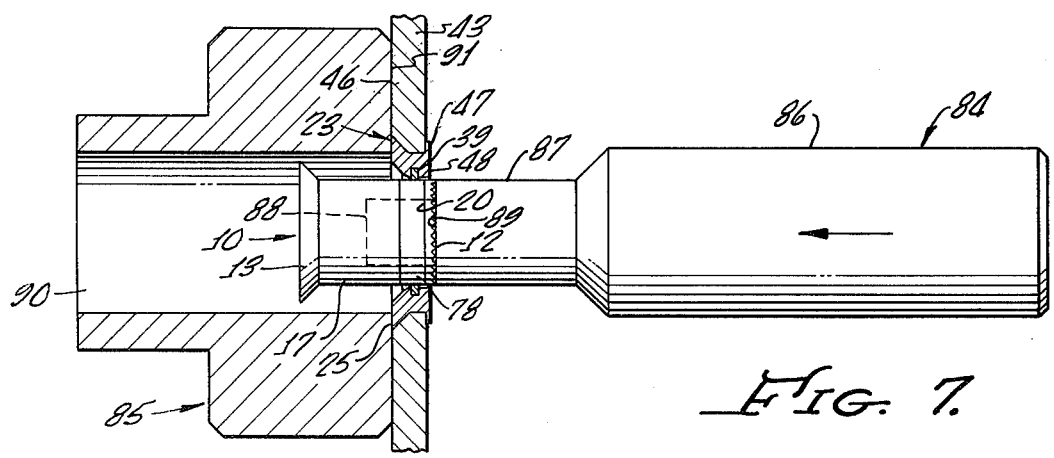
FIG. 7 is a view similar to FIG. 6 but showing the removal of the fastener element.

For removal of the nut 10, the backing block and punch are positioned as shown in FIG. 6. The backing block 85 is aligned axially with the fastener with its surface 91 bearing against the surface 46 of the panel 43 and the outer surface 25 of the head of the grommet 22. The punch 84 is positioned with its forward end 88 within the opening 11 of the nut, bringing the shoulder 89 into engagement with the outer end 12 of the nut. With the backing block 85 being held stationary, the punch 84 then is moved axially toward the panel, forcing the nut 10 out of the grommet and into the opening 90 of the backing block. As this occurs, the surface 91 of the backing block provides support for the panel 43 adjacent the grommet 22 so that the panel 43 is not flexed appreciably and is not damaged. The punch may be moved into the grommet 22 so that the retainer ring 39 bears against its cylindrical surface 87 as the nut is pushed outwardly. The punch 84 then is withdrawn in the opposite direction, leaving the grommet ready for receiving a replacement nut.

Alternative to the ring 77, the ring 93 of FIG. 8 may be used for removal of the nut. This ring is identical to the ring 77 except that it is made of metal and provided with an axial split 94 which enables its expansion. The outer surface 95 of the ring 93 is of the same diameter as the surfaces 17 and 21 of the nut and its tapered inner surface 96 is at the same angle as that of the tapered surface 19 of the nut. Consequently, the use and function of the ring 93 are the same as those of the ring 77.

The foregoing detailed description is to be clearly understood as given by way of illustration and example only, the spirit and scope of this invention being limited solely by the appended claims.

I claim:

1. In combination with a fastener element having a first exterior surface, a second exterior surface spaced from said first exterior surface, a third exterior surface including a portion converging from a location adjacent said first surface to a location adjacent said second surface, and a shoulder between said second and third surfaces, a resilient retainer ring encircling said fastener element, said ring having a free diameter less than that of said third surface and being slidable along said first and third surfaces and engageable with said shoulder, and means holding said retainer ring against substantial axial movement, whereby said engagement of said retainer ring with said shoulder limits axial movement of said fastener element relative to said retainer ring in one direction, a device for removing said fastener element from said retainer ring and holding means comprising an annular member,
said annular member having an outer surface which adjacent one end thereof is of a diameter substantially equal to the diameter of said second surface and having a greater wall thickness adjacent said one end of said annular member than adjacent the other end thereof,
said annular member being expansible for extending past said second surface so as to encircle said fastener element at said third surface thereof, and contractable around said third surface with said one end of said annular member adjacent said shoulder,
whereby said retainer ring can slide along said outer surface and past said shoulder for allowing said fastener element to be withdrawn through said retainer ring.

2. A device as recited in claim 1 in which said annular member has a length substantially equal to the length of said fastener element at said third exterior surface thereof.

3. A device as recited in claim 1 in which said third exterior surface is frustoconical and tapers at a predetermined angle, and in which said annular member has an inner surface which is frustoconical and tapers substantially at the same angle as that of said third exterior surface.

4. A device as recited in claim 3 in which said inner surface of said annular member intersects said outer surface of said annular member at said other end of said annular member.

5. A device as recited in claim 4 in which said annular member is continuous circumferentially and is made of a material sufficiently resilient to permit said expansion thereof.

6. A device as recited in claim 4 in which said annular member includes an axial interruption extending the length thereof for permitting said expansion of said annular member.

7. A device as recited in claim 1 in which said means holding said retainer ring against substantial axial movement is a grommet, and a panel having an opening receiving said grommet, said grommet being secured to said panel at said opening, and including in addition a backup member having a substantially flat surface for engaging said grommet and said panel at a location adjacent said first exterior surface of said fastener element, said backup member having an opening for receiving said fastener element when said fastener element is so withdrawn through said retainer ring.

8. A device as recited in claim 7 including in addition a member for pushing said fastener element out of said retainer ring and said grommet out into said opening in said backup member.

9. A device as recited in claim 8 in which said fastener element is a nut having an opening extending inwardly from an end thereof adjacent said third exterior surface, said member for pushing said fastener element being engageable with said end of said nut.

10. A device as recited in claim 9 in which said member for pushing said fastener element includes an extension substantially complementarily receivable in said opening of said nut, and a shoulder for engaging said end of said nut.

11. A device as recited in claim 10 in which said member for pushing said fastener element includes a portion inwardly of said shoulder thereof which has substantially the same diameter as that of said second surface, whereby said portion of said punch can enter said retainer ring when said fastener element is pushed out of said retainer ring.

* * * * *